United States Patent [19]
Takeuchi

[11] 3,867,735
[45] Feb. 25, 1975

[54] SIDE BRUSH OPERATING MEANS FOR A VEHICLE CLEANING APPARATUS

[75] Inventor: Shigeo Takeuchi, Nagoya, Japan

[73] Assignee: Takeuchi Tekko Kabushiki Kaisha, Aichi-ken, Japan

[22] Filed: Mar. 22, 1973

[21] Appl. No.: 344,038

[30] Foreign Application Priority Data
May 25, 1972  Japan................................ 47-51191

[52] U.S. Cl. ............... 15/21 D, 15/DIG. 2, 15/21 E
[51] Int. Cl. ............................................... B60s 3/06
[58] Field of Search ............. 15/DIG. 2, 21 D, 21 E, 15/53, 97

[56] References Cited
UNITED STATES PATENTS

| 3,233,264 | 2/1966 | Nicki et al. | 15/21 E |
| 3,601,833 | 8/1971 | Takeuchi | 15/21 E |
| 3,662,419 | 5/1972 | Dini | 15/21 E |

Primary Examiner—Edward L. Roberts

[57] ABSTRACT

A pair of motored side brush carriages are mounted on a motored trolley, supported on a pair of inclined side rails, and capable of travelling forwardly by a force exerted by an advancing vehicle and backwardly under the drive of a motor. Said side brush carriages are mounted on respective aligned guide tracks, formed on said trolley for movement toward and away from each other. With this arrangement, the side brushes are automatically operated to follow the contour of the vehicle, at all times under the same pressure of contacting engagement with the vehicle irrespective of its speed, relative to the vehicle cleaning apparatus.

2 Claims, 8 Drawing Figures

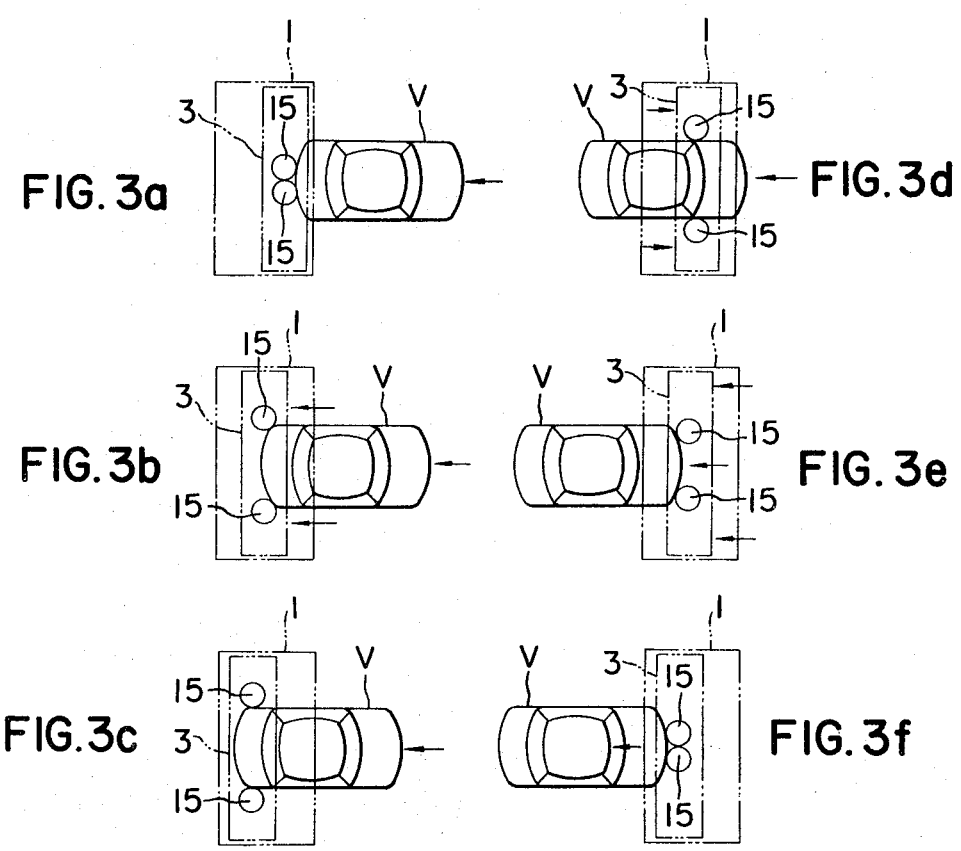

SIDE BRUSH OPERATING MEANS FOR A VEHICLE CLEANING APPARATUS

BACKGROUND OF THE INVENTION

The invention relates to vehicle cleaning apparatus of the ordinary type, including a portal frame through which a vehicle to be cleaned progresses, and a pair of side brushes operable to clean the surfaces of the vehicle and more particularly, to side brush operating means of such vehicle cleaning apparatus.

Apparatus for cleaning vehicles, such as automobiles, have previously been known which include a stationary or movable portal frame, and a plurality of side brushes supported thereon and in which, as a vehicle to be cleaned runs through the portal frame, or the latter is moved with the vehicle standing still, the side brushes are moved to follow the contour of the vehicle while maintaining contacting engagement therewith thereby to clean the front, side and rear surfaces, of the vehicle in a consecutive fashion.

With such type of vehicle cleaning apparatus, however, it has often been difficult to control the operation of the side brushes in a manner so that a predetermined level of contact pressure be maintained between the vehicle, and the side brushes, throughout the cleaning operation principally, on account of the fact that the speed of travel of the vehicle relative to the portal frame, is liable to vary to a substantial extent, particularly in cases where the vehicle is advanced under the control of the driver. This has naturally made the cleaning operation of such side brushes uneven and inefficient.

SUMMARY OF THE INVENTION

In view of the foregoing, the present invention is intended to realize a vehicle cleaning apparatus of the type described which can operate efficiently, irrespective of the speed at which a vehicle to be cleaned is moved relative to the portal frame of the apparatus.

To attain this objective, the present invention provides novel side brush operating means for vehicle cleaning apparatus of the type described, which are designed to enable the side brushes of the apparatus to follow the contour of the vehicle being cleaned, keeping contacting engagement therewith under a predetermined level of pressure throughout the cleaning operation, despite of any possible change in speed of the vehicle relative to the apparatus.

BRIEF DESCRIPTION OF THE DRAWINGS

The present invention will now be described with reference to the accompanying drawings, which illustrate one preferred embodiment of the invention, and the manner in which it operates and in which drawings:

FIG. 3 illustrates successive stages of operation of the embodiment.

DESCRIPTION OF THE PREFERRED EMBODIMENT

Figure 1:
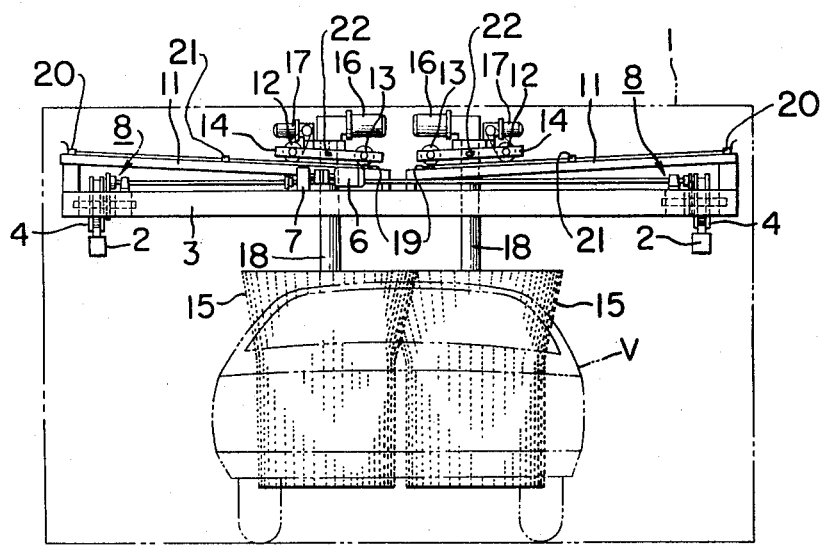
FIG. 1 is a front elevation of the apparatus embodying the present invention.

In the drawings, reference numeral 1 indicates the portal frame or main structure of the vehicle cleaning apparatus illustrated therein, and through which a vehicle to be cleaned is moved. Arranged on the opposite sides of the portal frame are a pair of fixed guide rails 2,2 which extend in spaced parallel relation to each other longitudinally of the apparatus, or in the direction in which a vehicle to be cleaned is moved. The fixed guide rails are inclined forwardly downwardly for obtaining the substantially same contacting pressure between side brushes and vehicle surfaces, during washing of the rear portion of the vehicle, as obtained when the front portion thereof is washed and on which are supported a trolley or movable frame 3 carrying a pair of drive wheels 4,4 and a pair of plain wheels 5,5.

A motor 6, which can operate continuously to exert a constant torque even when forced to stop rotation under a certain load above a predetermined level, is mounted on the movable frame 3 and is operable to drive the latter along the fixed guide rails 2,2 by rotating the drive wheels 4,4 in either direction through the intermediary of a speed reduction gear 7 and a torque transmitting mechanism 8. The motor 6, will come to stop when loaded above the set level of torque. Reference numerals 9 and 10 (FIG. 2) indicate respective stops arranged on the frame 1, adjacent the opposite ends of the fixed guide rails 2,2 to limit the movement of movable frame 3 in respective directions.

A pair of aligned guide tracks 11,11 are formed symmetrically on the movable frame 3, and extend lengthwise thereof or at right angles to the direction of travel of the vehicle to be cleaned. As clearly seen in FIG. 1, the guide tracks 11,11 are inclined inwardly downward toward each other. A pair of second trolleys, or wheeled carriages, 14,14 are mounted on the respective guide tracks 11,11 for traversing movement therealong. Reference numerals 12 and 13 respectively indicate drive wheels and plain wheels rotatably mounted on each of the carriages 14. A motor 17 is mounted on each of the carriages 14, and serves to drive the drive wheels 12 thereon. Further, a pair of side brushes 15,15 are rotatably suspended by means of respective supporting shafts 18,18, which are pivotally secured to respective carriages 14,14 by conventional connecting means for swinging movement in the direction of travel of the vehicle, and are rotatable under the drive of respective motors 16,16 mounted on the carriages 14,14. Reference character V indicates a vehicle to be cleaned.

Description will next be made of the operation of the apparatus illustrated, principally with reference to FIG. 3.

Figure 2:
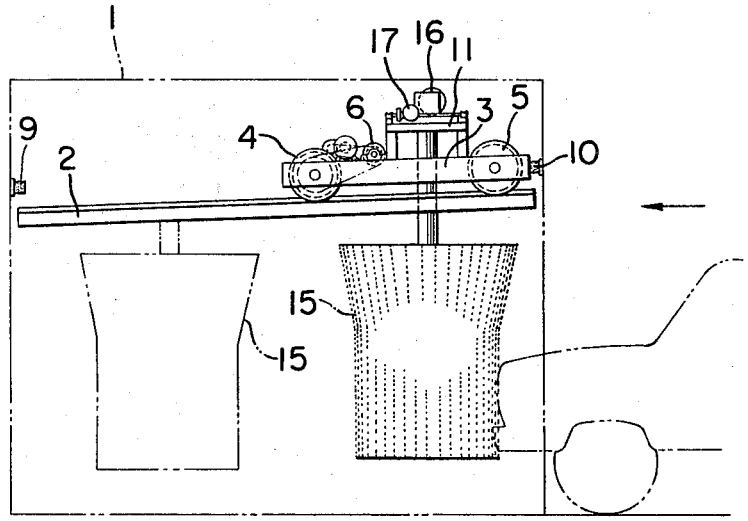
FIG. 2 is a side elevation of same.

For cleaning operation, initially, the adjustable constant torque motor 6 on the movable frame 3 is energized to turn clockwise, as viewed in FIG. 2, so that the movable frame 3 is driven to travel over the inclined fixed guide rails 2,2 in the ascending direction, until it is engaged by the stop 10 and held stationary at the upper ends of the guide rails 2,2, as shown in FIG. 2. At this stage, the carriages 14,14, supporting respective side brushes 15,15, lie closest to each other in their lowest position under the effect of gravity, thus holding the pair of side brushes 15,15 closed, as shown in FIG. 1.

Subsequently, a vehicle V to be cleaned, is moved in the direction indicated by the arrow in FIG. 2 and the front surface of the vehicle is brought into engagement with the side brushes 15,15 (FIG. 3a), which are thus slightly tilted in the direction of travel of the vehicle to operate respective limit switches 22,22, thereby to start the motors 17,17. As the consequence, the carriages 14,14 are driven along the respective guide tracks 11,11 in the ascending direction, moving the side brushes 15,15 apart from each other. In the meantime, the force exerted by vehicle V exceeds the torque setting of the constant torque motor 6, allowing the trolley 3 to start to move down the fixed guide rails 2,2. In this manner, the side brushes 15,15, contacting the front surface of the vehicle V under a predetermined pressure, are first moved forward and then sidewise, apart from each other with the progress of the vehicle, thereby to effectively wash the front surface of the vehicle (FIG. 3b).

As the side brushes 15,15 are moved apart from each other enough to operate limit switches 20,20 associated with motors 17,17, these motors are caused to stop and the second trolleys or carriages 14,14 are allowed to move inwardly toward each other under the effect of gravity and placed in contacting engagement with the respective side surfaces of the vehicle V (FIG. 3c). With such movement of side brushes 15,15 from the front surface to the side surfaces of the vehicle, the motor 6 on the movable frame or trolley 3 is released from any substantial resistance of the side brushes, and starts again to turn clockwise, as viewed in FIG. 2, thereby to move the trolley 3 to the right or in the direction opposite to that in which the vehicle V proceeds, (FIG. 3d) so that the side surfaces thereof are washed clean by the respective side brushes 15,15. Subsequently, the carriages 14,14 carrying the side brushes 15,15 are allowed to move toward each other under gravity, the brushes 15,15 moving from the respective sides of the vehicle V to the rear side thereof while keeping contact with the vehicle. With downward movement of the brushes 15,15 in the inward direction, the switch 21 associated with the motor 6 is operated with downward or inward movement of the respective carriages 14 for the purpose of reversing the motor 6 to cause the latter to turn in this time counterclockwise, as viewed in FIG. 2. At this point, the torque setting of the motor can be adjusted, if required as described hereinafter. Accordingly, the trolley 3 is driven to follow the vehicle V as the side brushes 15,15 move toward each other so that the rear surface of the vehicle is effectively washed clean by such side brushes (FIG. 3e). It is to be understood that the adjustment of the torque setting of constant torque motor 6 is so effected that the side brushes 15,15 are held in contact with the rear surface of the vehicle under the substantially same pressure as that previously obtained between the front surface of the vehicle and the side brushes. Limit switches 19,19 and 20,20 are all of conventional type, and are arranged on guide tracks 11,11 near the adjacent and remote ends thereof. The former pair are adapted to operate upon engagement with carriages 14,14 to start motors 17,17 attached thereto. The latter pair are operable upon engagement with the carriages 14,14 to stop motor 17,17.

As the side brushes 15,15 are placed close to each other at the rear of the vehicle, the trolley 3 comes to stop at the lower end of the guide rails 2, engaging with the adjacent stop 9, and the cleaning operation is completed (FIG. 3f).

To summarize, according to the present invention, a pair of side brushes 15,15 are carried on a movable frame or trolley 3, which is mounted on a pair of fixed guide rails 2,2 extending in the direction of travel of the vehicle to be cleaned, and inclined forwardly downward and which is movable back and forth along the guide rails. Owing to such arrangement, the side brushes 15,15 can exactly follow the contour of the vehicle, particularly at the front and rear thereof even if the speed of the vehicle relative to the portal frame 1 of the cleaning apparatus varies as when the vehicle is advanced under the control of the driver and can be held against the vehicle at all times under the same pressure evenly to clean all the surfaces of the vehicle, including the front and rear surfaces thereof.

According also to the present invention, the side brushes 15,15 are supported on respective wheeled carriages 14,14, mounted on the trolley 3 for reciprocating movement transverse to the direction of travel of the vehicle, and this enables substantial reduction in the distance of movement of the vehicle, relative to the frame 1 and hence in size of the entire cleaning apparatus.

While one preferred embodiment of the present invention has been shown and described herein, it will be apparent to those skilled in the art, that various changes and modifications may be made therein without departing from the spirit of the invention or from the scope of the appendant claim.

What is claimed is:

1. A vehicle cleaning apparatus of the type including a portal frame through which a vehicle to be cleaned progresses, said apparatus comprising: a pair of fixed guide rails arranged on the opposite sides of said portal frame in spaced parallel relation to each other and extending forwardly downwardly in the direction of travel of the vehicle, a trolley mounted on said fixed guide rails, a motor for driving said trolley along said pair of fixed guide rails, said motor being capable of operating continuously to exert a constant torque even when forced to stop rotation under a predetermined load above a predetermined level, and a pair of side brush units mounted on said trolley for movement toward and away from each other lengthwise thereof.

2. A vehicle cleaning apparatus as claimed in claim 1, in which said trolley carries a pair of aligned guide tracks extending lengthwise thereof and inclined downwardly toward each other, and in which each of said side brush units includes a wheeled carriage mounted on the respective one of said aligned guide tracks, a side brush tiltably suspended on said wheeled carriage, and a drive motor associated with said side brush so as to start with tilting movement thereof to drive said wheeled carriage upwardly along said guide track and to stop when said wheeled carriage reaches the upper end of said guide track.

* * * * *